United States Patent
Zeng

(10) Patent No.: US 11,317,334 B2
(45) Date of Patent: Apr. 26, 2022

(54) INTER-CELL HANDOVER METHOD AND APPARATUS

(71) Applicant: Huawei Technologies Co., Ltd., Shenzhen (CN)

(72) Inventor: Xin Zeng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 158 days.

(21) Appl. No.: 16/749,815

(22) Filed: Jan. 22, 2020

(65) Prior Publication Data
US 2020/0162988 A1    May 21, 2020

Related U.S. Application Data

(63) Continuation of application No. PCT/CN2017/094766, filed on Jul. 27, 2017.

(51) Int. Cl.
*H04W 36/26* (2009.01)
*H04W 76/27* (2018.01)
(Continued)

(52) U.S. Cl.
CPC ....... *H04W 36/26* (2013.01); *H04W 36/0038* (2013.01); *H04W 36/08* (2013.01); *H04W 76/27* (2018.02)

(58) Field of Classification Search
CPC . H04W 36/26; H04W 76/27; H04W 36/0038; H04W 36/08; H04W 36/0072;
(Continued)

(56) References Cited

U.S. PATENT DOCUMENTS 8,208,928 B2 * 6/2012 Hapsari ............ H04W 12/0471
   455/438
8,311,512 B2 * 11/2012 Kitazoe ................ H04W 12/04
   455/410
(Continued)

FOREIGN PATENT DOCUMENTS

CN    1819698 A    8/2006
CN    1921379 A    2/2007
(Continued)

OTHER PUBLICATIONS

3rd Generation Partnership Project; Technical Specification Group Services and System Aspects; Study on the security aspects of the next generation system (Release 14), 3GPP TR 33.899 V1.2.0 (Jun. 2017), pp. 1-586.
(Continued)

*Primary Examiner* — Magdi Elhag
(74) *Attorney, Agent, or Firm* — Slater Matsil, LLP

(57) ABSTRACT

Obtaining, by a source cell, a key retention policy of a terminal device, where the source cell and the terminal device use a first key to communicate with each other; determining, by the source cell according to the key retention policy of the terminal device and a key retention policy of the source cell, whether the terminal device and a target cell use the first key to communicate with each other; and sending, by the source cell, a handover request message to the target cell, where the handover request message is used to request to hand over the terminal device from the source cell to the target cell, the handover request message includes first indication information, and the first indication information is used to indicate whether the terminal device and the target cell use the first key to communicate with each other.

18 Claims, 7 Drawing Sheets

(51) Int. Cl.
*H04W 36/00* (2009.01)
*H04W 36/08* (2009.01)

(58) Field of Classification Search
CPC ............ H04W 36/0077; H04W 12/04; H04W 36/0016
See application file for complete search history.

(56) References Cited

U.S. PATENT DOCUMENTS

| | | | |
|---|---|---|---|
| 8,600,384 B1 | 12/2013 | Moreno et al. | |
| 2009/0209259 A1* | 8/2009 | Brusilovsky | H04W 12/04 455/438 |
| 2011/0201337 A1 | 8/2011 | Forsberg et al. | |
| 2014/0334371 A1* | 11/2014 | Kim | H04W 8/24 370/311 |
| 2017/0078874 A1* | 3/2017 | Lee | H04W 36/0055 |
| 2017/0318458 A1* | 11/2017 | Laselva | H04W 12/041 |
| 2018/0041930 A1* | 2/2018 | Hampel | H04W 88/10 |
| 2019/0014509 A1* | 1/2019 | Nakarmi | H04W 76/19 |
| 2019/0253942 A1* | 8/2019 | Yoo | H04W 80/02 |
| 2020/0008054 A1* | 1/2020 | Wifvesson | H04W 36/14 |
| 2020/0162906 A1* | 5/2020 | Hu | H04W 36/08 |

FOREIGN PATENT DOCUMENTS

| | | |
|---|---|---|
| CN | 101552985 A | 10/2009 |
| CN | 101889423 A | 11/2010 |
| CN | 102056160 A | 5/2011 |
| CN | 104363622 A | 2/2015 |
| JP | 2009093854 A | 4/2009 |
| WO | 2017061924 A1 | 4/2017 |

OTHER PUBLICATIONS

ETSI, "LTE; Evolved Universal Terrestrial Radio Access Network (E-UTRAN); X2 Application Protocol (X2AP) (Release 14)", ETSI TS 136 423 V14.1.0 (Jun. 2017), pp. 1-241.

3rd Generation Partnership Project;Technical Specification Group Services and System Aspects; 3GPP System Architecture Evolution (SAE); Security architecture (Release 15), 3GPP TS 33.401 V15.0.0 (Jun. 2017), 153 pages.

3rd Generation Partnership Project; Technical Specification Group Services and System Aspects; Study on the security aspects of the next generation system (Release 14), 3GPP TR 33.899 V1.1.0 (Mar. 2017), 491 pages.

Ericsson, "New solution—Flexibile mechanism for AS key-change", 3GPP TSG SA WG3 (Security) Meeting #86-Bis, S3-170957, revision of S3-170728, Mar. 27-31, 2017, Busan (South Korea), 3 pages.

MCC, "Report of 3GPP TSG RAN WG3 meeting #66bis, Valencia, Spain, Jan. 1822, 2010", TSG-RAN Working Group 3 meeting #67, R3-101045, San Francisco, USA, Feb. 22-26, 2010, 133 pages.

* cited by examiner

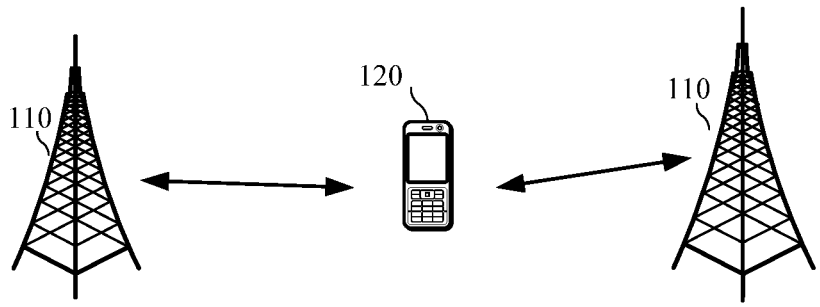

A source cell obtains a key retention policy of a terminal device, where the source cell and the terminal device use a first key to communicate with each other, and the key retention policy of the terminal device is used to indicate a condition for the terminal device to determine to retain the first key ~ S210

The source cell determines, according to the key retention policy of the terminal device and a key retention policy of the source cell, whether the terminal device and a target cell use the first key to communicate with each other, where the key retention policy of the source cell is used to indicate a condition for the source cell to determine to retain the first key ~ S220

The source cell sends a handover request message to the target cell, where the handover request message is used to request to hand over the terminal device from the source cell to the target cell, the handover request message includes first indication information, and the first indication information is used to indicate whether the terminal device and the target cell use the first key to communicate with each other ~ S230

A target cell receives a handover request message sent by a source cell, where the handover request message is used to request to hand over a terminal device from the source cell to the target cell, the handover request message includes first indication information, the first indication information is used to indicate whether the terminal device and the target cell use a first key to communicate with each other, the source cell and the terminal device use the first key to communicate with each other, and the first indication information is determined by the source cell according to a key retention policy of the terminal device and a key retention policy of the source cell ∼ S310

The target cell determines, according to the first indication information and a key retention policy of the target cell, whether to use the first key to communicate with the terminal device, where the key retention policy of the target cell is used to indicate a condition for the target cell to determine to retain the first key ∼ S320

A terminal device receives a radio resource control RRC connection reconfiguration message sent by a source cell, where the RRC connection reconfiguration message includes second indication information, the second indication information is used to indicate whether the terminal device and a target cell use a first key to communicate with each other, and the first key is a key used for communication between the source cell and the terminal device ∿ S410

When the second indication information is used to indicate that the terminal device and the target cell do not use the first key to communicate with each other, the terminal device determines to use a second key to communicate with the target cell, where the second key is a backup key used for communication between the terminal device and the target cell ∿ S420

FIG. 4

INTER-CELL HANDOVER METHOD AND APPARATUS

CROSS-REFERENCE TO RELATED APPLICATIONS

This application is a continuation of International Application No. PCT/CN2017/094766, filed on Jul. 27, 2017, which is hereby incorporated by reference in its entirety.

TECHNICAL FIELD

Embodiments of this application relate to the communications field, and more specifically, to an inter-cell handover method and apparatus.

BACKGROUND

In consideration of information security, in a process of communication between a terminal device and a cell that the terminal device accesses, a key is used to encrypt data to be transmitted. If inter-cell handover occurs, for example, the terminal device is handed over from a source cell to a target cell, whether the terminal device and the target cell can use an original key (that is, a key used for communication between the terminal device and the source cell before handover) to communicate with each other needs to be considered. This is because that key updating is unnecessary in some scenarios, and instead key updating leads to some adverse effects. For example, in an intra-cell handover scenario or in a scenario in which handover is performed within one central unit (center unit, CU), the terminal device is located within a same secure area before and after handover is performed, especially in the case of intra-cell handover; and if a key is updated, some data is encrypted by using the original key and is sent from the source cell, but the terminal device already accesses the target cell, and the terminal device needs to decrypt the data and uses a new key to encrypt and send the data in the target cell. As a result, a data sending delay is increased.

In the existing inter-cell handover procedure, the terminal device, the source cell, and the target cell all may determine whether to retain the original key. When the terminal device, the source cell, and the target cell all determine that the original key can be retained, the terminal device and the target cell can use the original key to communicate with each other, or otherwise, a new key needs to be generated, and the terminal device and the target cell use the new key to communicate with each other. However, when the source cell determines to retain the original key, the target cell determines to retain the original key, and the terminal device determines to update the key, the target cell generates the new key only after receiving indication information, sent by the terminal device, used to indicate whether to retain the original key. Before both the target cell and the terminal device generate the new key, a message used for communication between the terminal device and the target cell is protected by using the original key, causing a relatively high security risk.

SUMMARY

Embodiments of this application provide an inter-cell handover method and apparatus, to help improve inter-cell handover security.

According to a first aspect, an inter-cell handover method is provided. The method includes: obtaining, by a source cell, a key retention policy of a terminal device, where the source cell and the terminal device use a first key to communicate with each other, and the key retention policy of the terminal device is used to indicate a condition for the terminal device to determine to retain the first key; determining, by the source cell according to the key retention policy of the terminal device and a key retention policy of the source cell, whether the terminal device and a target cell use the first key to communicate with each other, where the key retention policy of the source cell is used to indicate a condition for the source cell to determine to retain the first key; and sending, by the source cell, a handover request message to the target cell, where the handover request message is used to request to hand over the terminal device from the source cell to the target cell, the handover request message includes first indication information, and the first indication information is used to indicate whether the terminal device and the target cell use the first key to communicate with each other.

It should be understood that the key retention policy may be preconfigured. The key retention policy of the source cell may be whether to forcibly change a key, whether to retain an original key when the source cell and the target cell are corresponding to one network element, or the like. The key retention policy of the terminal device may be that a key needs to be changed when handover is performed between heterogeneous cells, that a key needs to be changed when use duration of the original key exceeds a first threshold, or the like. A key retention policy of the target cell may be whether to forcibly change a key, whether to retain an original key when the source cell and the target cell are corresponding to one network element, or the like. This is not limited in this embodiment of this application.

According to the inter-cell handover method in this embodiment of this application, the source cell obtains the key retention policy of the terminal device in advance, that is, the key retention policy of the terminal device is considered in advance. The target cell can determine, before communicating with the terminal device, whether to retain the original key finally. This resolves the following problem resulting from that decision of the terminal device lags behind decision of the target cell: Information sent by the terminal device and the target cell is protected still by using the original key when the key is updated. Therefore, when it is determined that the key is updated, the target cell can use a new key to communicate with the terminal device, thereby helping improve inter-cell handover security.

In a first possible implementation of the first aspect, when the source cell determines that the terminal device and the target cell use the first key to communicate with each other, the handover request message further includes the first key, a second key, and a next hop chaining counter NCC of the second key, and the second key is a backup key used for communication between the terminal device and the target cell.

Specifically, when the source cell determines to retain the first key, the source cell may add the first key and the second key to the handover request message, and send the handover request message to the target cell. The second key is a backup key generated by the source cell. If the target cell determines to retain the first key, the target cell may directly communicate with the terminal device based on the received first key. If the target cell determines not to retain the first key, the target cell may directly communicate with the terminal device based on the received second key.

In this way, the target cell may directly use the key sent by the source cell, thereby avoiding the following case resulting from that a key derivation algorithm of the target cell is different from a key derivation algorithm of the terminal device: After the terminal device accesses the target cell, a key used by the target cell is inconsistent with a key used by the terminal device.

With reference to the foregoing possible implementation of the first aspect, in a second possible implementation of the first aspect, the handover request message further includes use duration information of the first key.

Therefore, when the source cell determines to retain the first key, the source cell sends the use duration information of the first key to the target cell, so that a problem of insecurity resulting from that the first key is not changed for a long time can be avoided.

It should be understood that, the use duration information of the first key may be a quantity of seconds for which the first key is used, or a quantity of packet data convergence protocol (packet data convergence protocol, PDCP) packets of which encryption and decryption are implemented by using the first key. This is not limited in this embodiment of this application.

With reference to the possible implementation of the first aspect, in a third possible implementation of the first aspect, when the source cell determines that the terminal device and the target cell do not use the first key to communicate with each other, the handover request message further includes a second key and a next hop chaining counter NCC of the second key, and the second key is a backup key used for communication between the terminal device and the target cell.

Specifically, when the source cell determines not to retain the first key, the source cell may directly add the second key to the handover request message, and send the handover request message to the target cell; and after receiving the second key, the target cell may directly use the second key to communicate with the terminal device.

It should be understood that, the second key may be generated by the source cell according to a key derivation algorithm that is agreed on between the source cell and the terminal device, or may be preconfigured. After generating the second key, the source cell may send the second key to both the target cell and the terminal device; or after generating the second key, the source cell may send the second key only to the target cell, and the terminal device itself generates the second key. This is not limited in this embodiment of this application.

With reference to the foregoing possible implementations of the first aspect, in a fourth possible implementation of the first aspect, the obtaining, by a source cell, a key retention policy of a terminal device includes: receiving, by the source cell, the key retention policy of the terminal device sent by a core network device; or receiving, by the source cell, the key retention policy of the terminal device sent by the terminal device.

With reference to the foregoing possible implementations of the first aspect, in a fifth possible implementation of the first aspect, the method further includes: receiving, by the source cell, a handover response message sent by the target cell, where the handover response message includes second indication information, and the second indication information is used to indicate whether the terminal device and the target cell use the first key to communicate with each other; and sending, by the source cell, a radio resource control RRC connection reconfiguration message to the terminal device, where the RRC connection reconfiguration message includes the second indication information.

When the second indication information indicates that the terminal device and the target cell use the second key to communicate with each other, the RRC connection reconfiguration message further includes the NCC of the second key.

Specifically, after the source cell sends the handover request message to the target cell, the source cell receives the handover response message sent by the target cell. The handover response message carries the second indication information used to indicate whether to retain the first key. The second indication information includes the key retention policy of the terminal device, the key retention policy of the source cell, and the key retention policy of the target cell. Therefore, the source cell may directly and transparently transfer the second indication information to the terminal device, notify the terminal device of a final decision, and send the NCC to the terminal device when the source cell uses the second key, so that the terminal device generates the finally used second key, to ensure that the terminal device and the target cell use the same key to communicate with each other.

According to a second aspect, another inter-cell handover method is provided. The method includes: receiving, by a target cell, a handover request message sent by a source cell, where the handover request message is used to request to hand over a terminal device from the source cell to the target cell, the handover request message includes first indication information, the first indication information is used to indicate whether the terminal device and the target cell use a first key to communicate with each other, the source cell and the terminal device use the first key to communicate with each other, the first indication information is determined by the source cell according to a key retention policy of the terminal device and a key retention policy of the source cell, the key retention policy of the terminal device is used to indicate a condition for the terminal device to determine to retain the first key, and the key retention policy of the source cell is used to indicate a condition for the source cell to determine to retain the first key; and determining, by the target cell according to the first indication information and a key retention policy of the target cell, whether to use the first key to communicate with the terminal device, where the key retention policy of the target cell is used to indicate a condition for the target cell to determine to retain the first key.

According to the inter-cell handover method in this embodiment of this application, the source cell obtains the key retention policy of the terminal device in advance, that is, the key retention policy of the terminal device is considered in advance. The target cell can determine, before communicating with the terminal device, whether to retain the original key finally. This resolves the following problem resulting from that decision of the terminal device lags behind decision of the target cell: Information sent by the terminal device and the target cell is protected still by using the original key when the key is updated. Therefore, when it is determined that the key is updated, the target cell can use a new key to communicate with the terminal device, thereby helping improve inter-cell handover security.

In a first possible implementation of the second aspect, when the first indication information indicates that the terminal device and the target cell use the first key to communicate with each other, the handover request message further includes the first key, a second key, and a next hop chaining counter NCC of the second key, and the second key is a backup key used for communication between the terminal device and the target cell. The method further includes: when the target cell determines not to use the first key to communicate with the terminal device, determining, by the target cell, to use the second key to communicate with the terminal device.

With reference to the foregoing possible implementation of the second aspect, in a second possible implementation of the second aspect, the handover request message further includes use duration information of the first key; and the determining, by the target cell according to the first indication information and a key retention policy of the target cell, whether to use the first key to communicate with the terminal device includes: determining, by the target cell according to the key retention policy of the target cell and the use duration information of the first key, whether to use the first key to communicate with the terminal device.

With reference to the foregoing possible implementations of the second aspect, in a third possible implementation of the second aspect, after the determining, by the target cell, whether to use the first key to communicate with the terminal device, the method further includes: sending, by the target cell, a handover response message to the source cell, where the handover response message includes second indication information, and the second indication information is used to indicate whether the terminal device and the target cell use the first key to communicate with each other.

When the second indication information indicates that the terminal device and the target cell use the second key to communicate with each other, the handover response message further includes the NCC of the second key.

According to a third aspect, another inter-cell handover method is provided. The method includes: receiving, by a terminal device, a radio resource control RRC connection reconfiguration message sent by a source cell, where the RRC connection reconfiguration message includes second indication information, the second indication information is used to indicate whether the terminal device and the target cell use the first key to communicate with each other, and the first key is a key used for communication between the source cell and the terminal device; and when the second indication information is used to indicate that the terminal device and the target cell do not use the first key to communicate with each other, determining, by the terminal device, to use a second key to communicate with the target cell, where the second key is a backup key used for communication between the terminal device and the target cell.

In a first possible implementation of the third aspect, the method further includes: when the second indication information is used to indicate that the terminal device and the target cell use the first key to communicate with each other, determining, by the terminal device, to use the first key to communicate with the target cell.

With reference to the foregoing possible implementation of the third aspect, in a second possible implementation of the third aspect, when the second indication information indicates that the terminal device and the target cell use the second key to communicate with each other, the RRC connection reconfiguration message further includes the NCC. The method further includes: generating, by the terminal device, the second key based on the NCC.

It should be understood that, when the second indication information indicates that the terminal device and the target cell use the first key to communicate with each other, the terminal device can still use the original first key, with no need to generate a new key based on the NCC.

With reference to the foregoing possible implementations of the third aspect, in a third possible implementation of the third aspect, before the receiving, by the terminal device, a radio resource control RRC connection configuration message sent by a source cell, the method further includes: sending, by the terminal device, a key retention policy of the terminal device to the source cell, where the key retention policy of the terminal device is used to indicate a condition for the terminal device to determine to retain the first key.

According to a fourth aspect, an inter-cell handover apparatus is provided, configured to perform the method in the first aspect or any possible implementation of the first aspect. Specifically, the apparatus includes units configured to perform the method in the first aspect or any possible implementation of the first aspect.

According to a fifth aspect, an inter-cell handover apparatus is provided, configured to perform the method in the second aspect or any possible implementation of the second aspect. Specifically, the apparatus includes units configured to perform the method in the second aspect or any possible implementation of the second aspect.

According to a sixth aspect, an inter-cell handover apparatus is provided, configured to perform the method in the third aspect or any possible implementation of the third aspect. Specifically, the apparatus includes units configured to perform the method in the third aspect or any possible implementation of the third aspect.

According to a seventh aspect, an inter-cell handover apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. When the processor executes the instruction stored in the memory, the execution makes the processor perform the method in the first aspect or any possible implementation of the first aspect.

According to an eighth aspect, an inter-cell handover apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. When the processor executes the instruction stored in the memory, the execution makes the processor perform the method in the second aspect or any possible implementation of the second aspect.

According to a ninth aspect, an inter-cell handover apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. When the processor executes the instruction stored in the memory, the execution makes the processor perform the method in the third aspect or any possible implementation of the third aspect.

According to a tenth aspect, a computer program product is provided. The computer program product includes computer program code. When the computer program code is run by a source cell, the source cell is enabled to perform the method in the first aspect or any possible implementation of the first aspect.

According to an eleventh aspect, a computer program product is provided. The computer program product includes computer program code. When the computer program code is run by a target cell, the target cell is enabled to perform the method in the second aspect or any possible implementation of the second aspect.

According to a twelfth aspect, a computer program product is provided. The computer program product includes computer program code. When the computer program code is run by a terminal device, the terminal device is enabled to perform the method in the third aspect or any possible implementation of the third aspect.

According to a thirteenth aspect, a computer-readable medium is provided, where the computer-readable medium is configured to store a computer program. The computer program includes an instruction used to perform the method in the first aspect or any possible implementation of the first aspect.

According to a fourteenth aspect, a computer-readable medium is provided, where the computer-readable medium is configured to store a computer program. The computer program includes an instruction used to perform the method in the second aspect or any possible implementation of the second aspect.

According to a fifteenth aspect, a computer-readable medium is provided, where the computer-readable medium is configured to store a computer program. The computer program includes an instruction used to perform the method in the third aspect or any possible implementation of the third aspect.

BRIEF DESCRIPTION OF THE DRAWINGS

FIG. 1 is a schematic diagram of a communications system according to an embodiment of this application;

FIG. 2 is a schematic flowchart of an inter-cell handover method according to an embodiment of this application;

FIG. 3 is a schematic flowchart of another inter-cell handover method according to an embodiment of this application;

FIG. 4 is a schematic flowchart of another inter-cell handover method according to an embodiment of this application;

DETAILED DESCRIPTION OF ILLUSTRATIVE EMBODIMENTS

Figure 5:
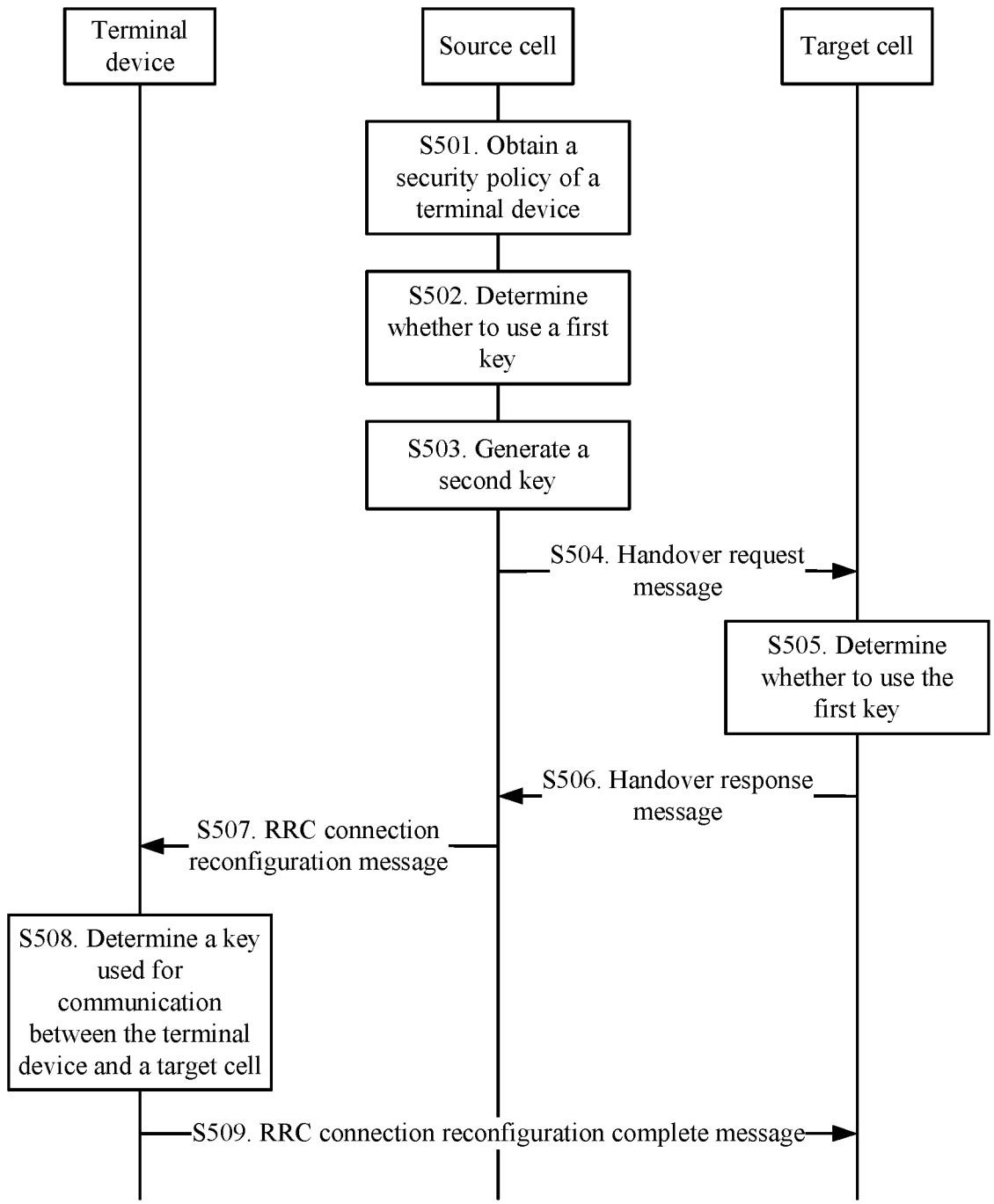
FIG. 5 is a schematic flowchart of another inter-cell handover method according to an embodiment of this application.

The following describes the technical solutions in the embodiments of this application with reference to the accompanying drawings in the embodiments of this application.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5G system.

FIG. 1 shows a communications system 100 applied to an embodiment of this application. The communications system 100 may include at least two network devices 110. The network device 110 may be a device that communicates with a terminal device, for example, a base station or a base station controller. Each network device 110 may provide communication coverage to a particular geographical area, and may communicate with a terminal device (for example, UE) located within this coverage area (a cell). The network device 110 may be a base transceiver station (BTS) in a GSM system, a code division multiple access (CDMA) system, a NodeB (node B, NB) in a WCDMA system, an evolved NodeB (evolutional node B, eNB or eNodeB) in an LTE system, or a radio controller in a cloud radio access network (CRAN). Alternatively, the network device may be a relay station, an access point, an in-vehicle device, a wearable device, a network-side device in a future 5G network, a network device in a future evolved public land mobile network (PLMN), or the like.

The wireless communications system 100 further includes at least one terminal device 120 located within a coverage area of the network device 110. The terminal device 120 may be mobile or fixed. The terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, or a terminal device in a future evolved public land mobile network (PLMN), or the like.

FIG. 1 shows an example in which there are two network devices and one terminal device. Optionally, the communications system 100 may include a plurality of network devices, and another quantity of terminal devices may be included within a coverage area of each network device. This is not limited in this embodiment of this application.

Optionally, the wireless communications system 100 may further include a network controller, a mobility management entity, and another network entity. This embodiment of this application is not limited thereto.

In consideration of information security, in a process of communication between a terminal device and a cell that the terminal device accesses, a key is used to encrypt data to be transmitted. If inter-cell handover occurs, for example, the terminal device is handed over from a source cell to a target cell, whether the terminal device and the target cell can use an original key (that is, a key used for communication between the terminal device and the source cell before handover) to communicate with each other needs to be considered.

Considering that the target cell may be an area with a relatively strict requirement on security, for example, a government area, the key needs to be forcibly updated for such type of cell. Therefore, the terminal device, the source cell, and the target cell all may determine whether to retain the original key. When the terminal device, the source cell, and the target cell all are allowed to retain the original key, the terminal device and the target cell can use the original key to communicate with each other, or otherwise, a new key needs to be generated, and the terminal device and the target cell use the new key to communicate with each other. In the existing handover procedure, the source cell first needs to add, to a handover request message, a decision whether the source cell retains the original key, and send the handover request message to the target cell. Then the target cell sends a handover response message to the source cell based on a decision of the target cell, where the handover response message carries indication information used to indicate whether to retain the original key. The source cell sends the indication information to the terminal device, and the terminal device sends, to the target cell based on a decision of the terminal device, the indication information used to indicate whether to retain the original key.

When the source cell determines to retain the original key, the target cell determines to retain the original key, and the terminal device determines to update the key, the target cell generates the new key only after receiving the indication information, sent by the terminal device, used to indicate whether to retain the original key. Before both the target cell and the terminal device generate the new key, a message used for communication between the terminal device and the target cell is protected by using the original key, causing a relatively high security risk. Therefore, the embodiments of this application provide a new inter-cell handover method.

It should be understood that, in the embodiments of this application, a cell may represent a coverage area of the network device 110, or may represent a coverage area of a sector of the network device 110. This is not limited in the embodiments of this application.

For ease of understanding, the following uses an inter-cell handover procedure of one terminal device as an example to describe the embodiments of this application in details.

FIG. 2 is a schematic flowchart of an inter-cell handover method 200 according to an embodiment of this application. The method 200 may be applied to the communications system 100 shown in FIG. 1. However, this embodiment of this application is not limited thereto.

S210. A source cell obtains a key retention policy of a terminal device, where the source cell and the terminal device use a first key to communicate with each other, and the key retention policy of the terminal device is used to indicate a condition for the terminal device to determine to retain the first key.

S220. The source cell determines, according to the key retention policy of the terminal device and a key retention policy of the source cell, whether the terminal device and a target cell use the first key to communicate with each other, where the key retention policy of the source cell is used to indicate a condition for the source cell to determine to retain the first key.

S230. The source cell sends a handover request message to the target cell, where the handover request message is used to request to hand over the terminal device from the source cell to the target cell, the handover request message includes first indication information, and the first indication information is used to indicate whether the terminal device and the target cell use the first key to communicate with each other.

Specifically, the terminal device accesses the source cell, and the source cell and the terminal device use the first key to communicate with each other, where the first key is an original key. Because the terminal device is mobile, if the terminal device moves into a coverage area of the target cell, a connection of the terminal device needs to be handed over from the source cell to the target cell. Because the source cell, the terminal device, and the target cell all can determine whether to retain the first key, the source cell, the terminal device, and the target cell have respective key retention policies. It should be understood that the key retention policies may be preconfigured. The key retention policy of the source cell may be whether to forcibly change a key, whether to retain the original key when the source cell and the target cell are corresponding to one network element, or the like. The key retention policy of the terminal device may be that a key needs to be changed when handover is performed between heterogeneous cells, that a key needs to be changed when use duration of the original key exceeds a first threshold, or the like. A key retention policy of the target cell may be whether to forcibly change a key, whether to retain the original key when the source cell and the target cell are corresponding to one network element, or the like. This is not limited in this embodiment of this application.

Before inter-cell handover is performed, the source cell may first obtain the key retention policy of the terminal device, and the source cell may determine, according to the key retention policy of the source cell and the key retention policy of the terminal device, whether to retain the first key, that is, determine whether to still use the first key for communication after the terminal device is handed over to the target cell. Then, the source cell may send the handover request message to the target cell, to request to hand over the terminal device from the source cell to the target cell, where the handover request message carries the first indication information used to indicate whether to retain the first key, in other words, the first indication information is used to indicate whether the terminal device and the target cell continue to use the first key to communicate with each other. In a possible implementation, the first indication information may be a one-bit indicator bit. For example, 0 represents that the original key continues to be used for communication, and 1 represents that the original key is not used for communication, that is, represents that the key need to be changed.

After the target cell receives the handover request message sent by the source cell, if the first indication information in the handover request message is used to indicate that the first key is not retained, the target cell may directly determine that the key needs to be updated. If the first indication information in the handover request message is used to indicate that the first key is retained, the target cell may determine, according to the key retention policy of the target cell, whether to retain the first key. The target cell sends a handover response message to the source cell, where the handover response message carries second indication information used to indicate whether to retain the first key. The second indication information may be the same as the first indication information or may be different from the first indication information. This depends on the key retention measurement of the target cell. When the target cell determines to retain the first key, the source cell and the target cell perform inter-cell handover according to an existing inter-cell handover procedure. When the target cell determines not to retain the first key, the target cell and the terminal device may separately obtain a second key, so that the target cell and the terminal device use the second key to communicate with each other. The second key may be obtained in a plurality of manners. The second key may be generated by the source cell and is sent to the target cell and the terminal device, or the second key may be generated by each of the target cell and the terminal device. This is not limited in this embodiment of this application.

In this embodiment of this application, the source cell obtains the key retention policy of the terminal device in advance, that is, the key retention policy of the terminal device is considered in advance. The target cell can determine, before communicating with the terminal device, whether to retain the original key finally. This resolves the following problem resulting from that decision of the terminal device lags behind decision of the target cell: Information sent by the terminal device and the target cell is protected still by using the original key when the key is updated.

Therefore, according to the inter-cell handover method in this embodiment of this application, the decision of the terminal device is considered in advance, the source cell determines, according to the key retention policy of the source cell and the key retention policy of the terminal device, whether to retain the original key; and when it is determined to update the key, the target cell can use the new key to communicate with the terminal device, thereby helping improve inter-cell handover security.

In an optional embodiment, when the source cell determines that the terminal device and the target cell use the first key to communicate with each other, the handover request message further includes the first key, a second key, and a next hop chaining counter NCC of the second key, and the second key is a backup key used for communication between the terminal device and the target cell, and the second key is a backup key used for communication between the terminal device and the target cell.

Specifically, when the source cell determines to retain the first key, the source cell may add the first key and the second key to the handover request message, and send the handover request message to the target cell. The second key is a backup key generated by the source cell. In this case, the source cell determines, only according to the key retention policy of the source cell and the key retention policy of the terminal device, to retain the first key, and there may be a case in which the target cell determines, according to the key retention policy of the target cell, to update the key. Therefore, the source cell may add the second key to the handover request message, and send the handover request message to the target cell. If the target cell determines to retain the first key, the target cell may directly communicate with the terminal device based on the received first key. If the target cell determines not to retain the first key, the target cell may directly communicate with the terminal device based on the received second key.

It should be understood that the source cell may send the next hop chaining counter (NCC) of the second key to the target cell, so that after the target cell makes final decision, the terminal device can obtain the NCC of the second key, and generate the second key based on the NCC, to ensure that the terminal device and the target cell use the same key to communicate with each other.

Optionally, the source cell may alternatively send an NCC of the first key to the target cell. This is not limited in this embodiment of this application.

In this way, the target cell may directly use the key sent by the source cell, thereby avoiding the following case resulting from that a key derivation algorithm of the target cell is different from a key derivation algorithm of the terminal device: After the terminal device accesses the target cell, a key used by the target cell is inconsistent with a key used by the terminal device.

In an optional embodiment, the handover request message further includes use duration information of the first key.

Specifically, when the source cell determines to retain the first key, the handover request message may further carry the use duration information of the first key. The target cell may determine, based on the use duration information of the first key and the key retention policy of the target cell, whether to retain the first key. For example, the use duration of the first key cannot exceed the first threshold, and the first threshold may be a specific preset value. If the use duration of the first key exceeds the first threshold, the target cell determines to update the first key.

Therefore, when the source cell determines to retain the first key, the source cell sends the use duration information of the first key to the target cell, so that a problem of insecurity resulting from that the first key is not changed for a long time can be avoided.

It should be understood that, the use duration information of the first key may be a quantity of seconds for which the first key is used, or a quantity of packet data convergence protocol (PDCP) packets of which encryption and decryption are implemented by using the first key. This is not limited in this embodiment of this application.

In an optional embodiment, when the source cell determines that the terminal device and the target cell do not use the first key to communicate with each other, the handover request message further includes a second key and a next hop chaining counter NCC of the second key, and the second key is a backup key used for communication between the terminal device and the target cell.

Specifically, when the source cell determines not to retain the first key, the source cell may directly add the second key to the handover request message, and send the handover request message to the target cell; and after receiving the second key, the target cell may directly use the second key to communicate with the terminal device.

It should be understood that, the second key may be generated by the source cell according to a key derivation algorithm that is agreed on between the source cell and the terminal device, or may be preconfigured. After generating the second key, the source cell may send the second key to both the target cell and the terminal device; or after generating the second key, the source cell may send the second key only to the target cell, and the terminal device itself generates the second key based on the NCC of the second key. This is not limited in this embodiment of this application.

In an optional embodiment, that a source cell obtains a key retention policy of a terminal device includes: The source cell receives the key retention policy of the terminal device sent by a core network device, or the source cell receives the key retention policy of the terminal device sent by the terminal device.

Specifically, the source cell may obtain the key retention policy of the terminal device in a plurality of manners. To be specific, the source cell may receive the key retention policy of the terminal device sent by the core network device, or the source cell may directly receive the key retention policy of the terminal device sent by the terminal device. This is not limited in this embodiment of this application.

In an optional embodiment, the method further includes: The source cell receives a handover response message sent by the target cell, where the handover response message includes second indication information, and the second indication information is used to indicate whether the terminal device and the target cell use the first key to communicate with each other; and the source cell sends a radio resource control RRC connection reconfiguration message to the terminal device, where the RRC connection reconfiguration message includes the second indication information.

When the second indication information indicates that the terminal device and the target cell use the second key to communicate with each other, the RRC connection reconfiguration message further includes the NCC of the second key.

Specifically, after the source cell sends the handover request message to the target cell, the source cell receives the handover response message sent by the target cell. The handover response message carries the second indication information used to indicate whether to retain the first key. The second indication information includes the key retention policy of the terminal device, the key retention policy of the source cell, and the key retention policy of the target cell. Therefore, when the second indication information indicates that the terminal device and the target cell use the second key to communicate with each other, the source cell may directly and transparently transfer, to the terminal device, the second indication information and the NCC that is used for generating the second key, and notify the terminal device of a final decision; and the terminal device generates the second key.

Optionally, the source cell may alternatively transfer the NCC of the first key to the terminal device transparently. This is not limited in this embodiment of this application.

FIG. 3 is a schematic flowchart of another inter-cell handover method 300 according to an embodiment of this application. The method 300 may be applied to the communications system 100 shown in FIG. 1. However, this embodiment of this application is not limited thereto.

S310. A target cell receives a handover request message sent by a source cell, where the handover request message is used to request to hand over a terminal device from the source cell to the target cell, the handover request message includes first indication information, the first indication information is used to indicate whether the terminal device and the target cell use a first key to communicate with each other, the source cell and the terminal device use the first key to communicate with each other, the first indication information is determined by the source cell according to a key retention policy of the terminal device and a key retention policy of the source cell, the key retention policy of the terminal device is used to indicate a condition for the terminal device to determine to retain the first key, and the key retention policy of the source cell is used to indicate a condition for the source cell to determine to retain the first key.

S320. The target cell determines, according to the first indication information and a key retention policy of the target cell, whether to use the first key to communicate with the terminal device, where the key retention policy of the target cell is used to indicate a condition for the target cell to determine to retain the first key.

According to the inter-cell handover method in this embodiment of this application, the source cell obtains the key retention policy of the terminal device in advance, that is, the key retention policy of the terminal device is considered in advance. The target cell can determine, before communicating with the terminal device, whether to retain an original key finally. This resolves the following problem resulting from that decision of the terminal device lags behind decision of the target cell: Information sent by the terminal device and the target cell is protected still by using the original key when the key is updated. Therefore, when it is determined that the key is updated, the target cell can use a new key to communicate with the terminal device, thereby helping improve inter-cell handover security.

In an optional embodiment, when the first indication information indicates that the terminal device and the target cell use the first key to communicate with each other, the handover request message further includes the first key, a second key, and an NCC of the second key, and the second key is a backup key used for communication between the terminal device and the target cell. The method further includes: When the target cell determines not to use the first key to communicate with the terminal device, the target cell determines to use the second key to communicate with the terminal device.

Specifically, when the source cell determines to retain the first key, the source cell may add the first key, the second key, and the NCC of the second key to the handover request message, and send the handover request message to the target cell. The second key is a backup key generated by the source cell. In this case, the source cell determines, only according to the key retention policy of the source cell and the key retention policy of the terminal device, to retain the first key, and there may be a case in which the target cell determines, according to the key retention policy of the target cell, to update the key. Therefore, the source cell may add the second key to the handover request message, and send the handover request message to the target cell. If the target cell determines to retain the first key, the target cell may directly communicate with the terminal device based on the received first key. If the target cell determines not to retain the first key, the target cell may directly communicate with the terminal device based on the received second key.

In this way, the target cell may directly use the key sent by the source cell, thereby avoiding the following case resulting from that a key derivation algorithm of the target cell is different from a key derivation algorithm of the terminal device: After the terminal device accesses the target cell, a key used by the target cell is inconsistent with a key used by the terminal device.

In an optional embodiment, the handover request message further includes use duration information of the first key, that the target cell determines, according to the first indication information and a key retention policy of the target cell, whether to use the first key to communicate with the terminal device includes: The target cell determines, according to the key retention policy of the target cell and the use duration information of the first key, whether to use the first key to communicate with the terminal device.

Specifically, when the source cell determines to retain the first key, the handover request message may further carry the use duration information of the first key. The target cell may determine, based on the use duration information of the first key and the key retention policy of the target cell, whether to retain the first key. For example, use duration of the first key cannot exceed a first threshold, and the first threshold may be a specific preset value. If the use duration of the first key exceeds the first threshold, the target cell determines to update the first key.

Therefore, when the source cell determines to retain the first key, the source cell sends the use duration information of the first key to the target cell, so that a problem of insecurity resulting from that the first key is not changed for a long time can be avoided.

It should be understood that, the use duration information of the first key may be a quantity of seconds for which the first key is used, or a quantity of packet data convergence protocol (PDCP) packets of which encryption and decryption are implemented by using the first key. This is not limited in this embodiment of this application.

In an optional embodiment, after the target cell determines whether to use the first key to communicate with the terminal device, the method further includes: The target cell sends a handover response message to the source cell, where the handover response message includes second indication information, and the second indication information is used to indicate whether the terminal device and the target cell use the first key to communicate with each other.

When the second indication information indicates that the terminal device and the target cell use the second key to communicate with each other, the handover response message further includes the NCC of the second key.

Specifically, the target cell may send a handover response message to the source cell. When the target cell determines whether to update the key, the handover response message carries the second indication information used to indicate whether to retain the first key. The second indication information includes the key retention policy of the terminal device, the key retention policy of the source cell, and the key retention policy of the target cell. In other words, the second indication information is a final decision whether to retain the first key. In addition, when the second indication information indicates that the terminal device and the target cell use the second key to communicate with each other, the handover response message further carries the NCC of the second key, and the NCC of the second key is transparently transferred by the source cell to the terminal device. The terminal device generates the second key, to ensure that the terminal device and the target cell use the same key to transmit data.

FIG. 4 is a schematic flowchart of another inter-cell handover method 400 according to an embodiment of this application. The method 400 may be applied to the communications system 100 shown in FIG. 1. However, this embodiment of this application is not limited thereto.

S410. A terminal device receives a radio resource control RRC connection reconfiguration message sent by a source cell, where the RRC connection reconfiguration message includes second indication information, the second indication information is used to indicate whether the terminal device and the target cell use the first key to communicate with each other, and the first key is a key used for communication between the source cell and the terminal device.

S420. When the second indication information is used to indicate that the terminal device and the target cell do not use the first key to communicate with each other, the terminal device determines to use a second key to communicate with the target cell, where the second key is a backup key used for communication between the terminal device and the target cell.

Specifically, the terminal device may receive the RRC connection reconfiguration message sent by the source cell, where the message carries a final decision whether to retain the first key, that is, the second indication information. Because the source cell makes decision according to a key retention policy of the terminal device, the terminal device does not need to perform determining according to the key retention policy of the terminal device, may directly determine, according to the second indication information, whether to retain the first key. When the second indication information indicates that the first key is not retained, the terminal device may use the second key to communicate with the target cell.

Therefore, the decision of the terminal device is considered in advance, the source cell determines, according to a key retention policy of the source cell and the key retention policy of the terminal device, whether to retain an original key; and when it is determined to update the key, the target cell can use the new key to communicate with the terminal device, thereby helping improve inter-cell handover security.

It should be understood that, the second key may be generated by the source cell according to a key derivation algorithm that is agreed on between the source cell and the terminal device, or may be preconfigured. After generating the second key, the source cell may send the second key to both the target cell and the terminal device; or after generating the second key, the source cell may send the second key only to the target cell, and the terminal device itself generates the second key. This is not limited in this embodiment of this application.

In an optional embodiment, the method further includes: When the second indication information is used to indicate that the terminal device and the target cell use the first key to communicate with each other, the terminal device determines to use the first key to communicate with the target cell.

In an optional embodiment, when the second indication information indicates that the terminal device and the target cell use the second key to communicate with each other, the RRC connection reconfiguration message further includes an NCC of the second key. The method further includes: The terminal device generates the second key based on the NCC of the second key.

In an optional embodiment, before the terminal device receives the radio resource control RRC connection configuration message sent by the source cell, the method further includes: The terminal device sends the key retention policy of the terminal device to the source cell, where the key retention policy of the terminal device is used to indicate a condition for the terminal device to determine to retain the first key.

FIG. 5 is a schematic flowchart of another inter-cell handover method 500 according to an embodiment of this application. The method 500 may be applied to the communications system 100 shown in FIG. 1. However, this embodiment of this application is not limited thereto.

S501. A source cell obtains a security policy of a terminal device, and the source cell and the terminal device use a first key to communicate with each other.

Optionally, the source cell may obtain the security policy of the terminal device in a plurality of manners, for example, obtain the security policy of the terminal device from a core network device or obtain the security policy of the terminal device from the terminal device. This is not limited in this embodiment of this application.

It should be understood that the security policy of the terminal device may be policy information of whether the terminal device retains a key, for example, information that the key needs to be updated after a specific period of time, and whether the key needs to be updated in the case of heterogeneous handover.

S502. The source cell determines, according to the security policy of the terminal device and a security policy of the source cell, whether the terminal device and a target cell use the first key to communicate with each other.

Specifically, the security policy of the source cell may be preset. The security policy of the source cell may include whether to update a key forcibly, whether the source cell and the target cell are corresponding to one network element, and another policy. However, this is not limited in this embodiment of this application.

S503. The source cell generates a second key based on the first key, where the second key is a backup key used for communication between the terminal device and the target cell.

It should be understood that, in this embodiment of this application, S503 may be performed before S501 and S502, may be performed after S501 and S502, or may be performed between S501 and S502. This is not limited in this embodiment of this application.

S504. The source cell sends a handover request message to the target cell, where the handover request message is used to request to hand over the terminal device from the source cell to the target cell, the handover request message includes first indication information, and the first indication information is used to indicate whether the terminal device and the target cell use the first key to communicate with each other.

When the source cell determines that the terminal device and target cell use the first key to communicate with each other, the handover request message further includes the first key, the second key, and an NCC of the second key. In this case, the handover request message further includes use duration information of the first key, for example, a quantity of seconds for which the first key is used or a quantity of data packets of which encryption and decryption are implemented by using the first key.

When the source cell determines that the terminal device and the target cell do not use the first key to communicate with each other, the handover request message further includes the second key and an NCC of the second key.

Correspondingly, the target cell receives the handover request message sent by the source cell, to obtain the key carried in the handover request message.

S505. The target cell determines, according to the first indication information and a security policy of the target cell, whether to use the first key to communicate with the terminal device.

Specifically, if the first indication information indicates that the terminal device and the target cell do not use the first key to communicate with each other, the target cell may directly determine to use the second key carried in the handover request message (the handover request message includes the second key and the NCC of the second key, and does not include the first key and an NCC of the first key), to communicate with the terminal device. If the first indication information indicates that the terminal device and the target cell use the first key to communicate with each other (the handover request message includes the first key, the second key, the NCC of the second key, and the use duration information of the first key), the target cell needs to determine, according to the security policy of the target cell and the use duration information of the first key, whether to use the first key to communicate with the terminal device.

It should be understood that, the security policy of the target cell may be preset, and the security policy of the source cell may include whether to update a key forcibly, whether the source cell and the target cell are corresponding to one network element, whether use duration of the first key exceeds a specific threshold, and another policy. However, this is not limited in this embodiment of this application.

When the target cell determines not to use the first key to communicate with the terminal device, the target cell may directly use the second key to communicate with the terminal device.

It should be understood that, according to the foregoing procedure, when the source cell determines to retain the first key (that is, the original key used for communication between the source cell and the terminal device), the source cell sends all of the first key, the second key (the backup key used for communication between the target cell and the terminal device), and the NCC of the second key to the target cell. The target cell may directly use the first key or the second key according to the indication information sent by the source cell and the security policy of the target cell, thereby avoiding the following problem resulting from that a key derivation algorithm of the target cell is different from a key derivation algorithm of the terminal device: After the terminal device accesses the target cell, a key used by the terminal device is inconsistent with a key used by the target cell.

S506. The target cell sends a handover response message to the source cell, where the handover response message includes second indication information, the second indication information is used to indicate whether the terminal device and the target cell use the first key to communicate with each other, and when the second indication information indicates that the terminal device and the target cell use the second key to communicate with each other, the handover response message further includes an NCC of the second key; and correspondingly, the source cell receives the handover response message sent by the target cell.

S507. The source cell sends a radio resource control RRC connection reconfiguration message to the terminal device, where the RRC connection reconfiguration message includes the second indication information, and when the second indication information indicates that the terminal device and the target cell use the second key to communicate with each other, the RRC connection reconfiguration message further includes the NCC of the second key; and correspondingly, the terminal device receives the radio resource control RRC connection reconfiguration message sent by the source cell.

S508. The terminal device determines, based on the RRC connection reconfiguration message, a key used for communication between the terminal device and the target cell.

Specifically, when the second indication information is used to indicate that the terminal device and the target cell use the first key to communicate with each other, the terminal device determines to use the first key to communicate with the target cell; or when the second indication information is used to indicate that the terminal device and the target cell do not use the first key to communicate with each other, the terminal device determines to use the second key to communicate with the target cell.

Optionally, when the second indication information indicates that the terminal device and the target cell use the second key to communicate with each other, the RRC connection reconfiguration message further includes the NCC of the second key; and the method further includes: the terminal device generates the second key based on the NCC of the second key; and when the second indication information indicates that the terminal device and the target cell use the second key to communicate with each other, the terminal device may directly use the existing first key to communicate with the target cell.

S509. The terminal device sends an RRC connection reconfiguration complete message to the target cell, to indicate that the terminal device completes setup of an RRC connection.

According to the inter-cell handover method in this embodiment of this application, the decision of the terminal device is considered in advance, the source cell determines, according to a key retention policy of the source cell and a key retention policy of the terminal device, whether to retain the original key; and when it is determined to update the key, the target cell can use the new key to communicate with the terminal device, thereby helping improve inter-cell handover security. In addition, in this application, the source cell sends the first key and the second key to the target cell, and the target cell may directly use the key sent by the source cell, thereby avoiding the following case resulting from that a key derivation algorithm of the target cell is different from a key derivation algorithm of the terminal device: After the terminal device accesses the target cell, a key used by the target cell is inconsistent with a key used by the terminal device.

It should be understood that the sequence numbers of the foregoing processes do not indicate an execution sequence. An execution sequence of the processes should be determined based on functions and internal logic of the processes, but should not constitute any limitation on an implementation process of this embodiment of this application.

The foregoing details the inter-cell handover methods according to the embodiments of this application with reference to FIG. 1 to FIG. 5. The following details inter-cell handover apparatuses according to the embodiments of this application with reference to FIG. 6 to FIG. 11.

Figure 6:
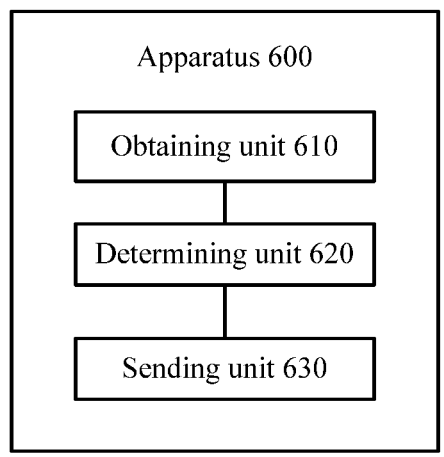
FIG. 6 is a schematic block diagram of an inter-cell handover apparatus according to an embodiment of this application.

FIG. 6 shows an inter-cell handover apparatus 600 according to an embodiment of this application. The apparatus 600 includes: an obtaining unit 610, configured to obtain a key retention policy of a terminal device, where the apparatus and the terminal device use a first key to communicate with each other, and the key retention policy of the terminal device is used to indicate a condition for the terminal device to determine to retain the first key; a determining unit 620, configured to determine, according to the key retention policy of the terminal device and a key retention policy of the apparatus, whether the terminal device and a target cell use the first key to communicate with each other, where the key retention policy of the apparatus is used to indicate a condition for the apparatus to determine to retain the first key; and a sending unit 630, configured to send a handover request message to the target cell, where the handover request message is used to request to hand over the terminal device from the apparatus to the target cell, the handover request message includes first indication information, and the first indication information is used to indicate whether the terminal device and the target cell use the first key to communicate with each other.

According to the inter-cell handover apparatus in this embodiment of this application, the source cell obtains the key retention policy of the terminal device in advance, that is, the key retention policy of the terminal device is considered in advance. The target cell can determine, before communicating with the terminal device, whether to retain an original key finally. This resolves the following problem resulting from that decision of the terminal device lags behind decision of the target cell: Information sent by the terminal device and the target cell is protected still by using the original key when the key is updated. Therefore, when it is determined that the key is updated, the target cell can use a new key to communicate with the terminal device, thereby helping improve inter-cell handover security.

Optionally, when the apparatus determines that the terminal device and the target cell use the first key to communicate with each other, the handover request message further includes the first key, a second key, and a next hop chaining counter NCC of the second key, and the second key is a backup key used for communication between the terminal device and the target cell.

Optionally, the handover request message further includes use duration information of the first key.

Optionally, when the apparatus determines that the terminal device and the target cell do not use the first key to communicate with each other, the handover request message further includes a second key and a next hop chaining counter NCC of the second key, and the second key is a backup key used for communication between the terminal device and the target cell.

Optionally, the obtaining unit 610 is specifically configured to: receive the key retention policy of the terminal device sent by a core network device; or receive the key retention policy of the terminal device sent by the terminal device.

Optionally, the obtaining unit 610 is specifically configured to: receive a handover response message sent by the target cell, where the handover response message includes second indication information, and the second indication information is used to indicate whether the terminal device and the target cell use the first key to communicate with each other; and send a radio resource control RRC connection reconfiguration message to the terminal device, where the RRC connection reconfiguration message includes the second indication information.

When the second indication information indicates that the terminal device and the target cell use the second key to communicate with each other, the RRC connection reconfiguration message further includes the NCC of the second key.

It should be understood that the apparatus 600 is presented in a form of a functional unit. The term "unit" herein may refer to an application-specific integrated circuit (ASIC), an electronic circuit, a processor configured to execute one or more software or firmware programs (for example, a shared processor, a dedicated processor, or a group processor), a memory, a combined logic circuit, and/or another proper component that supports the described functions. In an optional example, a person skilled in the art can understand that the apparatus 600 may be specifically the source cell in the foregoing embodiments, and the apparatus 600 may be configured to perform procedures and/or steps, corresponding to the source cell, in the foregoing method embodiments. To avoid repetition, details are not repeatedly described herein.

Figure 7:
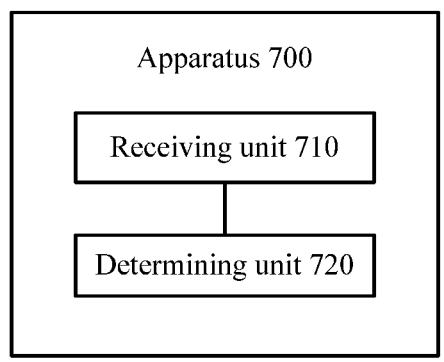
FIG. 7 is a schematic block diagram of another inter-cell handover apparatus according to an embodiment of this application.

FIG. 7 shows an inter-cell handover apparatus 700 according to an embodiment of this application. The apparatus 700 includes: a receiving unit 710, configured to receive a handover request message sent by a source cell, where the handover request message is used to request to hand over a terminal device from the source cell to the apparatus, the handover request message includes first indication information, the first indication information is used to indicate that the terminal device and the apparatus use a first key to communicate with each other, the source cell and the terminal device use the first key to communicate with each other, the first indication information is determined by the source cell according to a key retention policy of the terminal device and a key retention policy of the source cell, the key retention policy of the terminal device is used to indicate a condition for the terminal device to determine to retain the first key, and the key retention policy of the source cell is used to indicate a condition for the source cell to determine to retain the first key; and a determining unit 720, configured to determine, according to the first indication information and a key retention policy of the apparatus, whether to use the first key to communicate with the terminal device, where the key retention policy of the apparatus is used to indicate a condition for the apparatus to determine to retain the first key.

According to the inter-cell handover apparatus in this embodiment of this application, the source cell obtains the key retention policy of the terminal device in advance, that is, the key retention policy of the terminal device is considered in advance. The target cell can determine, before communicating with the terminal device, whether to retain an original key finally. This resolves the following problem resulting from that decision of the terminal device lags behind decision of the target cell: Information sent by the terminal device and the target cell is protected still by using the original key when the key is updated. Therefore, when it is determined that the key is updated, the target cell can use a new key to communicate with the terminal device, thereby helping improve inter-cell handover security.

Optionally, when the first indication information indicates that the terminal device and the apparatus use the first key to communicate with each other, the handover request message further includes the first key, a second key, and a next hop chaining counter NCC of the second key, and the second key is a backup key used for communication between the terminal device and the apparatus. The determining unit 720 is specifically configured to: when the apparatus determines not to use the first key to communicate with the terminal device, determine to use the second key to communicate with the terminal device.

Optionally, the handover request message further includes use duration information of the first key. The determining unit 720 is specifically configured to determine, according to the key retention policy of the apparatus and the use duration information of the first key, whether to use the first key to communicate with the terminal device.

Optionally, the apparatus 700 further includes a sending unit, configured to: after it is determined whether to use the first key to communicate with the terminal device, send a handover response message to the source cell, where the handover response message includes second indication information, and the second indication information is used to indicate whether the terminal device and the apparatus use the first key to communicate with each other.

When the second indication information indicates that the terminal device and the target cell use the second key to communicate with each other, the handover response message further includes the NCC of the second key.

It should be understood that the apparatus 700 is presented in a form of a functional unit. The term "unit" herein may refer to an application-specific integrated circuit (ASIC), an electronic circuit, a processor configured to execute one or more software or firmware programs (for example, a shared processor, a dedicated processor, or a group processor), a memory, a combined logic circuit, and/or another proper component that supports the described functions. In an optional example, a person skilled in the art can understand that the apparatus 700 may be specifically the target cell in the foregoing embodiments, and the apparatus 700 may be configured to perform procedures and/or steps, corresponding to the target cell, in the foregoing method embodiments. To avoid repetition, details are not repeatedly described herein.

Figure 8:
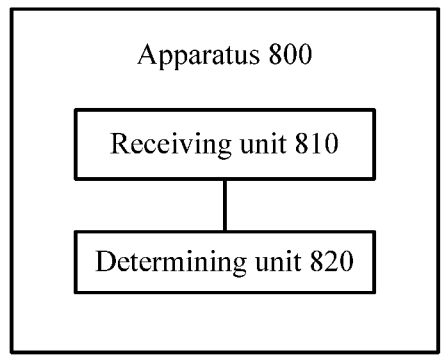
FIG. 8 is a schematic block diagram of another inter-cell handover apparatus according to an embodiment of this application.

FIG. 8 shows an inter-cell handover apparatus 800 according to an embodiment of this application. The apparatus 800 includes: a receiving unit 810, configured to receive a radio resource control RRC connection reconfiguration message sent by a source cell, where the RRC connection reconfiguration message includes second indication information, the second indication information is used to indicate whether the apparatus and the target cell use the first key to communicate with each other, and the first key is a key used for communication between the source cell and the apparatus; and a determining unit 820, configured to: when the second indication information is used to indicate that the apparatus and the target cell do not use the first key to communicate with each other, determine to use a second key to communicate with the target cell, where the second key is a backup key used for communication between the apparatus and the target cell.

According to the inter-cell handover apparatus in this embodiment of this application, the source cell obtains a key retention policy of the terminal device in advance, that is, the key retention policy of the terminal device is considered in advance. The target cell can determine, before communicating with the terminal device, whether to retain an original key finally. This resolves the following problem resulting from that decision of the terminal device lags behind decision of the target cell: Information sent by the terminal device and the target cell is protected still by using the original key when the key is updated. Therefore, when it is determined that the key is updated, the target cell can use a new key to communicate with the terminal device, thereby helping improve inter-cell handover security.

Optionally, the determining unit 820 is further configured to: when the second indication information is used to indicate that the apparatus and the target cell use the first key to communicate with each other, determine, for the apparatus, to use the first key to communicate with the target cell.

Optionally, when the second indication information indicates that the terminal device and the target cell use the second key to communicate with each other, the RRC connection reconfiguration message further includes an NCC of the second key; and the generation unit is configured to generate the second key based on the NCC of the second key.

Optionally, the apparatus 800 further includes a sending unit, configured to: before the radio resource control RRC connection configuration message sent by the source cell is received, send a key retention policy of the apparatus to the source cell, where the key retention policy of the apparatus is used to indicate a condition for the apparatus to determine to retain the first key.

It should be understood that the apparatus 800 is presented in a form of a functional unit. The term "unit" herein may refer to an application-specific integrated circuit (ASIC), an electronic circuit, a processor configured to execute one or more software or firmware programs (for example, a shared processor, a dedicated processor, or a group processor), a memory, a combined logic circuit, and/or another proper component that supports the described functions. In an optional example, a person skilled in the art can understand that the apparatus 800 may be specifically the terminal device in the foregoing embodiments, and the apparatus 800 may be configured to perform procedures and/or steps, corresponding to the terminal device, in the foregoing method embodiments. To avoid repetition, details are not repeatedly described herein.

Figure 9:
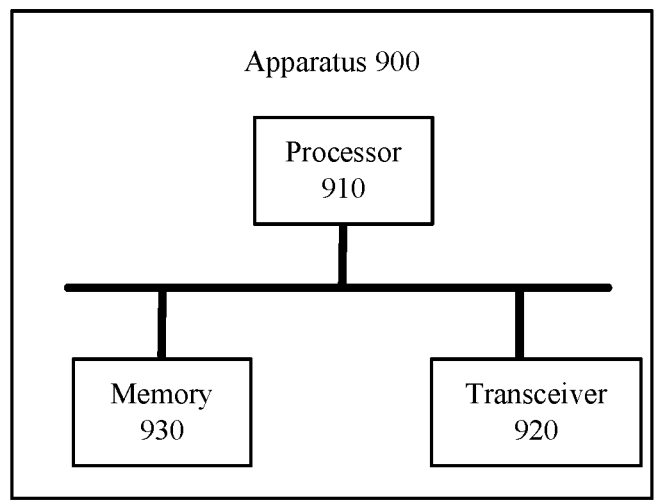
FIG. 9 is a schematic block diagram of another inter-cell handover apparatus according to an embodiment of this application.

FIG. 9 shows another inter-cell handover apparatus 900 according to an embodiment of this application. The apparatus 900 includes a processor 910, a transceiver 920, and a memory 930. The processor 910, the transceiver 920, and the memory 930 communicate with each other through an internal connection path. The memory 930 is configured to store an instruction. The processor 910 is configured to execute the instruction stored in the memory 930, to control the transceiver 920 to send a signal and/or receive a signal.

The transceiver 920 is configured to obtain a key retention policy of a terminal device, where the apparatus and the terminal device use a first key to communicate with each other, and the key retention policy of the terminal device is used to indicate a condition for the terminal device to determine to retain the first key.

The processor 910 is configured to determine, according to the key retention policy of the terminal device and a key retention policy of the apparatus, whether the terminal device and a target cell use the first key to communicate with each other, where the key retention policy of the apparatus is used to indicate a condition for the apparatus to determine to retain the first key.

The transceiver 920 is further configured to send a handover request message to the target cell, where the handover request message is used to request to hand over the terminal device from the apparatus to the target cell, the handover request message includes first indication information, and the first indication information is used to indicate whether the terminal device and the target cell use the first key to communicate with each other.

It should be understood that the apparatus 900 may be specifically the source cell in the foregoing embodiments, and may be configured to perform the steps and/or procedures, corresponding to the source cell, in the foregoing method embodiments. Optionally, the memory 930 may include a read-only memory and a random access memory, and provide the instruction and data to the processor. A part of the memory may further include a non-volatile random access memory. For example, the memory may further store information about a device type. The processor 910 may be configured to execute the instruction stored in the memory. When the processor 910 executes the instruction stored in the memory, the processor 910 is configured to perform the steps and/or the procedures, corresponding to the source cell, in the foregoing method embodiments.

Figure 10:
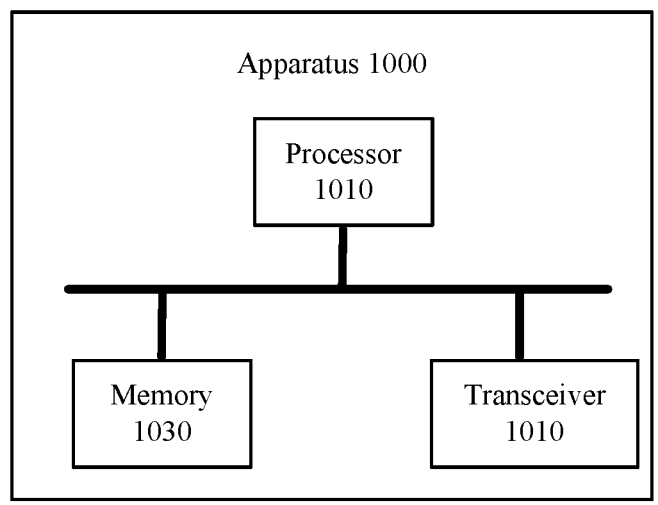
FIG. 10 is a schematic block diagram of another inter-cell handover apparatus according to an embodiment of this application.

FIG. 10 shows another inter-cell handover apparatus 1000 according to an embodiment of this application. The apparatus 1000 includes a processor 1010, a transceiver 1020, and a memory 1030. The processor 1010, the transceiver 1020, and the memory 1030 communicate with each other through an internal connection path. The memory 1030 is configured to store an instruction. The processor 1010 is configured to execute the instruction stored in the memory 1030, to control the transceiver 1020 to send a signal and/or receive a signal.

The transceiver 1020 is configured to receive a handover request message sent by a source cell. The handover request message is used to request to hand over a terminal device from the source cell to the apparatus. The handover request message includes first indication information, and the first indication information is used to indicate that the terminal device and the apparatus use the first key to communicate with each other. The source cell and the terminal device use the first key to communicate with each other. The first indication information is determined by the source cell according to a key retention policy of the terminal device and a key retention policy of the source cell. The key retention policy of the terminal device is used to indicate a condition for the terminal device to determine to retain the first key, and the key retention policy of the source cell is used to indicate a condition for the source cell to determine to retain the first key.

The processor 1010 is configured to determine, according to the first indication information and a key retention policy of the apparatus, whether to use the first key to communicate with the terminal device. The key retention policy of the apparatus is used to indicate a condition for the apparatus to determine to retain the first key.

It should be understood that the apparatus 1000 may be specifically the target cell in the foregoing embodiments, and may be configured to perform the steps and/or procedures, corresponding to the target cell, in the foregoing method embodiments. Optionally, the memory 1030 may include a read-only memory and a random access memory, and provide the instruction and data to the processor. A part of the memory may further include a non-volatile random access memory. For example, the memory may further store information about a device type. The processor 1010 may be configured to execute the instruction stored in the memory. When the processor 1010 executes the instruction stored in the memory, the processor 1010 is configured to perform the steps and/or the procedures, corresponding to the target cell, in the foregoing method embodiments.

Figure 11:
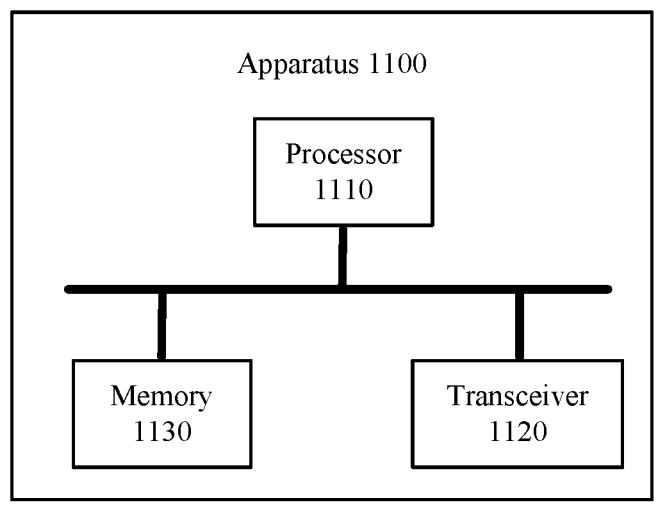
FIG. 11 is a schematic block diagram of another inter-cell handover apparatus according to an embodiment of this application.

FIG. 11 shows another inter-cell handover apparatus 1100 according to an embodiment of this application. The apparatus 1100 includes a processor 1110, a transceiver 1120, and a memory 1130. The processor 1110, the transceiver 1120, and the memory 1130 communicate with each other through an internal connection path. The memory 1130 is configured to store an instruction. The processor 1110 is configured to execute the instruction stored in the memory 1130, to control the transceiver 1120 to send a signal and/or receive a signal.

The transceiver 1120 is configured to receive a radio resource control RRC connection reconfiguration message sent by a source cell. The RRC connection reconfiguration message includes second indication information, the second indication information is used to indicate whether the apparatus and the target cell use the first key to communicate with each other, and the first key is a key used for communication between the source cell and the apparatus.

The processor 1110 is configured to: when the second indication information is used to indicate that the apparatus and the target cell do not use the first key to communicate with each other, determine to use a second key to communicate with the target cell. The second key is a backup key used for communication between the apparatus and the target cell.

It should be understood that the apparatus 1100 may be specifically the terminal device in the foregoing embodiments, and may be configured to perform the steps and/or procedures, corresponding to the terminal device, in the foregoing method embodiments. Optionally, the memory 1130 may include a read-only memory and a random access memory, and provide the instruction and data to the processor. A part of the memory may further include a non-volatile random access memory. For example, the memory may further store information about a device type. The processor 1110 may be configured to execute the instruction stored in the memory. When the processor 1110 executes the instruction stored in the memory, the processor 1110 is configured to perform the steps and/or the procedures, corresponding to the terminal device, in the foregoing method embodiments.

It should be understood that in this embodiment of this application, the processor in the foregoing apparatus may be a central processing unit (CPU), or the processor may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads an instruction from the memory and completes the steps in the foregoing methods in combination with hardware of the processor. To avoid repetition, details are not repeatedly described herein.

It should be noted that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for ease of convenience and brevity, for a detailed working process of the foregoing system, apparatus, and unit, reference may be made to a corresponding process in the foregoing method embodiments, and details are not repeatedly described herein.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   obtaining, by a source cell, a key retention policy of a terminal device, wherein the source cell and the terminal device use a first key to communicate with each other, and the key retention policy of the terminal device indicates a condition for the terminal device to determine to retain the first key;
   determining, by the source cell according to the key retention policy of the terminal device and a key retention policy of the source cell, whether the terminal device and a target cell use the first key to communicate with each other, wherein the key retention policy of the source cell indicates a condition for the source cell to determine to retain the first key; and
   sending, by the source cell, a handover request message to the target cell, wherein the handover request message requests to hand over the terminal device from the source cell to the target cell; and
   wherein when the source cell determines that the terminal device and the target cell use the first key to communicate with each other, the handover request message comprises first indication information, the first key, and a second key, the first indication information indicates whether the terminal device and the target cell use the first key to communicate with each other, and the second key is a backup key used for communication between the terminal device and the target cell.

2. The method according to claim 1, wherein when the source cell determines that the terminal device and the target cell use the first key to communicate with each other, the handover request message further comprises a next hop chaining counter (NCC) of the second key.

3. The method according to claim 2, wherein the handover request message further comprises use duration information of the first key.

4. The method according to claim 1, wherein when the source cell determines that the terminal device and the target cell do not use the first key to communicate with each other, the handover request message comprises the first indication information, the second key and a next hop chaining counter (NCC) of the second key.

5. The method according to claim 1, wherein obtaining, by the source cell, the key retention policy of the terminal device comprises:
receiving, by the source cell, the key retention policy of the terminal device sent by a core network device.

6. The method according to claim 1, wherein obtaining, by the source cell, the key retention policy of the terminal device comprises:
receiving, by the source cell, the key retention policy of the terminal device sent by the terminal device.

7. The method according to claim 1, further comprising:
receiving, by the source cell, a handover response message sent by the target cell, wherein the handover response message comprises second indication information, and the second indication information indicates whether the terminal device and the target cell use the first key to communicate with each other; and
sending, by the source cell, a radio resource control (RRC) connection reconfiguration message to the terminal device, wherein the RRC connection reconfiguration message comprises the second indication information; and
wherein when the second indication information indicates that the terminal device and the target cell use the second key to communicate with each other, the RRC connection reconfiguration message further comprises a next hop chaining counter (NCC) of the second key.

8. An apparatus, comprising:
a processor;
a non-transitory computer-readable storage medium storing a program to be executed by the processor, the program including instructions for:
obtaining a key retention policy of a terminal device, wherein the apparatus and the terminal device use a first key to communicate with each other, and the key retention policy of the terminal device indicates a condition for the terminal device to determine to retain the first key; and
determining, according to the key retention policy of the terminal device and a key retention policy of the apparatus, whether the terminal device and a target cell use the first key to communicate with each other, wherein the key retention policy of the apparatus indicates a condition for the apparatus to determine to retain the first key; and
a transmitter, configured to send a handover request message to the target cell, wherein the handover request message requests to hand over the terminal device from the apparatus to the target cell, and wherein when it is determined that the terminal device and the target cell use the first key to communicate with each other, the handover request message comprises first indication information, the first key, and a second key, and wherein the first indication information indicates whether the terminal device and the target cell use the first key to communicate with each other, and the second key is a backup key used for communication between the terminal device and the target cell.

9. The apparatus according to claim 8, wherein when it is determined that the terminal device and the target cell use the first key to communicate with each other, the handover request message further comprises a next hop chaining counter (NCC) of the second key.

10. The apparatus according to claim 9, wherein the handover request message further comprises use duration information of the first key.

11. The apparatus according to claim 8, wherein when it is determined that the terminal device and the target cell do not use the first key to communicate with each other, the handover request message comprises a next hop chaining counter (NCC) of the second key.

12. The apparatus according to claim 8, wherein the program includes instructions for:
receiving the key retention policy of the terminal device sent by a core network device.

13. The apparatus according to claim 8, wherein the program includes instructions for:
receiving the key retention policy of the terminal device sent by the terminal device.

14. The apparatus according to claim 8, wherein the program includes instructions for:
receiving a handover response message sent by the target cell, wherein the handover response message comprises second indication information, and the second indication information indicates whether the terminal device and the target cell use the first key to communicate with each other; and
sending a radio resource control (RRC) connection reconfiguration message to the terminal device, wherein the RRC connection reconfiguration message comprises the second indication information; and
wherein when the second indication information indicates that the terminal device and the target cell use the second key to communicate with each other, the RRC connection reconfiguration message further comprises a next hop chaining counter (NCC) of the second key.

15. An apparatus, comprising:
a receiver, configured to receive a radio resource control (RRC) connection reconfiguration message sent by a source cell, wherein the RRC connection reconfiguration message comprises second indication information, the second indication information indicates a final decision as to whether the apparatus and a target cell use a first key to communicate with each other, and the first key is a key used for communication between the source cell and the apparatus, and the final decision is a determination based on a key retention policy of the apparatus indicating a condition for the apparatus to determine to retain the first key, a key retention policy of the source cell indicating a condition for the source cell to determine to retain the first key, and a key retention policy of the target cell indicating a condition for the target cell to determine to retain the first key;
a processor; and a non-transitory computer-readable storage medium storing a program to be executed by the processor, the program including instructions for:
in response to the second indication information indicating that the apparatus and the target cell do not use the first key to communicate with each other, determine to use a second key to communicate with the target cell, wherein the second key is a backup key that is different from the first key and is used for communication between the apparatus and the target cell, and the second key is sent from the source cell to the target cell for the target cell to use to communicate with the apparatus.

16. The apparatus according to claim 15, wherein the program further includes instructions for:
in response to the second indication information indicating that the apparatus and the target cell use the first key to communicate with each other, determine, for the apparatus, to use the first key to communicate with the target cell.

17. The apparatus according to claim 16, wherein when the second indication information indicates that the apparatus and the target cell use the second key to communicate with each other, the RRC connection reconfiguration message further comprises a next hop chaining counter (NCC) of the second key; and the program further includes instructions for:
generating the second key based on the NCC of the second key.

18. The apparatus according to claim 15, further comprising:
a transmitter, configured to:
before the radio resource control (RRC) connection configuration message sent by the source cell is received, send the key retention policy of the apparatus to the source cell.

* * * * *